United States Patent [19]

Heitkamp, III et al.

[11] Patent Number: 4,578,041
[45] Date of Patent: Mar. 25, 1986

[54] WATER ACTUATED INFLATABLE FLOAT DEVICE

[75] Inventors: Lawrence F. Heitkamp, III, Chesterfield; John J. Heitkamp, Jr., Union, both of Mo.

[73] Assignee: Trip-Saver Inc., Chesterfield, Mo.

[21] Appl. No.: 642,390

[22] Filed: Aug. 20, 1984

[51] Int. Cl.⁴ .............................................. B63B 22/22
[52] U.S. Cl. ........................................ 441/30; 441/95
[58] Field of Search .......................... 441/7-9, 441/30, 95, 97, 100, 94

[56] References Cited

U.S. PATENT DOCUMENTS

| | | | |
|---|---|---|---|
| 2,506,884 | 5/1950 | Myers | 441/30 |
| 2,531,586 | 11/1950 | Ramsey | 441/8 |
| 2,775,951 | 1/1957 | Billmeyer | 441/9 X |
| 3,221,932 | 12/1965 | Anderson | 441/95 X |
| 3,302,224 | 2/1967 | Boucher | 441/94 |

*Primary Examiner*—Sherman D. Basinger
*Attorney, Agent, or Firm*—Haverstock, Garrett and Roberts

[57] ABSTRACT

A flotation device including an inflatable member, a compressed gas source including a container therefor with a port therein, a seal normally sealing the port, a body member having a bore extending therethrough, a connection member connecting the port of the compressed gas container to the body member adjacent the bore and in registration therewith, a piston member positioned in the bore and movable therein between a first position engaging the seal closing the port in the compressed gas container and a second position spaced from the seal, the piston member having a member thereon capable of rupturing the seal closing the port in the compressed gas container in the first position thereof, an outlet port through the body portion communicating the bore with an inlet opening of the inflatable member when the piston member is in the second position thereof, a piston engaging member positioned on the body member and movable between one position wherein the piston engaging member retains the piston member in the first position thereof and another position wherein the piston engaging member allows the piston member to be moved to the second position thereof, and a liquid responsive member adaptable for retaining the piston engaging member in the one position thereof and adaptable for releasing the piston engaging member when exposed to a liquid.

6 Claims, 4 Drawing Figures

WATER ACTUATED INFLATABLE FLOAT DEVICE

BACKGROUND OF THE INVENTION

The present invention generally relates to a flotation device and more particularly to an inflatable flotation device for attachment to or incorporation into an object having a density greater than that of water, the device being inflatable in response to submersion of the object in water thereby causing the object to be floated to the surface of the water for ease in retrieving the object.

There are many instances of objects sinking into the water which cannot be retrieved at a reasonable cost or for other reasons. For example, much fishing and boating equipment is lost due to accidental sinking of such equipment. Examples of such equipment include fishing rods and reels, outboard motors, fish tackle boxes and bait boxes and the like. The loss of such equipment can be costly and inconvenient without reliable means for retrieving such equipment.

The present invention provides an inflatable flotation device for recovering sinkable objects which incorporates a valve mechanism that is rendered operative in response to submersion in water whereby the inflatable flotation device will cause the object to be floated to the surface of the water for quick recovery.

Prior art devices heretofore proposed for retrieving submerged objects have certain disadvantages. For example, the devices disclosed in Harper U.S. Pat. No. 2,821,725; Burker U.S. Pat. No. 3,071,787; Davis U.S. Pat. No. 3,266,668; and Mackal U.S. Pat. No. 4,260,075 require a spring loaded plunger member having a piercing pin to pierce the seal of a container of compressed gas when the device is submerged in water. The success of recovery therefore depends upon the proper functioning of the spring loaded piercing pin. The present device overcomes this disadvantage by providing means for containing the compressed gas within the container after the seal has been pierced by manual means but allowing the gas to escape and inflate an inflatable article when submerged in water.

SUMMARY OF THE INVENTION

The present invention provides an inflatable flotation device including a compressed gas container that has a port therein with sealing means extending across the port to retain the compressed gas in the compressed gas container. The port is connected to the main body portion of a valve mechanism and lies in registration with a bore extending through the main body portion. The bore includes an orifice that acts as a gas relief jet which communicates the bore with the inlet opening of an inflatable article such as a balloon. The bore also includes a piston member that has means for rupturing the sealing means across the port of the compressed gas container. The piston member extends the length of the bore and has a head at one end that is substantially equal in diameter to the diameter of the bore. The piston member is movable between one position wherein the piston head sealably engages the sealing means across the port in the compressed gas container and another position wherein the piston head is spaced from the first position. It is important to the present invention that the air relief jet be positioned in the space between the two positions associated with the piston member. The shaft of the piston extends through a hole located at the rear of the bore that has a diameter that is substantially equal to the diameter of the piston shaft. The end of the piston shaft that extends through the hole abuts a lever member having first and second ends. The first end is pivotally connected adjacent where the piston shaft abuts the lever. The second end is attached to a water destructible member such as a paper ring that will dissolve or tear when it absorbs water to maintain the piston member in the one position. This paper ring extends around the neck of the compressed gas container and is attached so that it prevents movement of the lever. The sealing engagement between the piston head and sealing means across the port is thereby maintained until the water destructible member is exposed to water and thereby destroyed. When the water destructible member no longer holds the lever in position, the compressed gas will force the piston member to the other position wherein the gas relief jet is in communication with the compressed gas in the compressed gas container. The compressed gas will then pass through the gas relief jet and into the inflatable article. To control the destruction of the water destructible member, there is a water flow regulator positioned adjacent the water destructible member that also extends around the compressed gas container. The regulator is open on the side facing the compressed gas container and has a plurality of small holes on the side facing the valve mechanism. An absorbent material such as foam rubber is placed between the open side and the side containing the plurality of holes so that this, in conjunction with the plurality of small holes, reduces the flow of water through the regulator to a minimum. A valve cover, made of non-permeable material, is placed over the valve mechanism and is pinched around the edge of the water flow regulator to protect the main body portion of the valve mechanism as well as the components therein. The valve cover has a small hole that lies in registration with the gas relief jet to allow for the inlet portion of an inflatable article such as a balloon to be inserted therethrough to be attached to the valve mechanism in registration with the gas relief jet.

It is a principal object of the present invention to provide an inflatable flotation device.

Another object of the present invention is to provide means for containment of the compressed gas within the gas container after the seal is manually pierced.

Another object of the present invention is to provide means for allowing the compressed gas to escape from the gas container and into an inflatable article upon submersion in water.

It is a further object to provide an inflatable flotation device wherein the force associated with expansion of the compressed gas is utilized to actuate the means for allowing the compressed gas to escape from the gas container and into an inflatable article.

It is a further object of the present invention to provide an inflatable float device wherein the container of compressed gas is replaceable.

It is a further object of the present invention to provide a more reliable float device of simple, low cost construction.

Still another object of the present invention is to provide an inflatable flotation device which can be made to operate automatically upon submersion in water or to be manually operable for use with life preservers.

Another object of the present invention is to provide means for preventing operativeness of an inflatable float device except when submerged in water.

These and other objects and advantages will become apparent to those familiar with the art after considering the following detailed specification in conjunction with the accompanying drawings wherein:

DETAILED DESCRIPTION OF THE INVENTION

Figure 1:
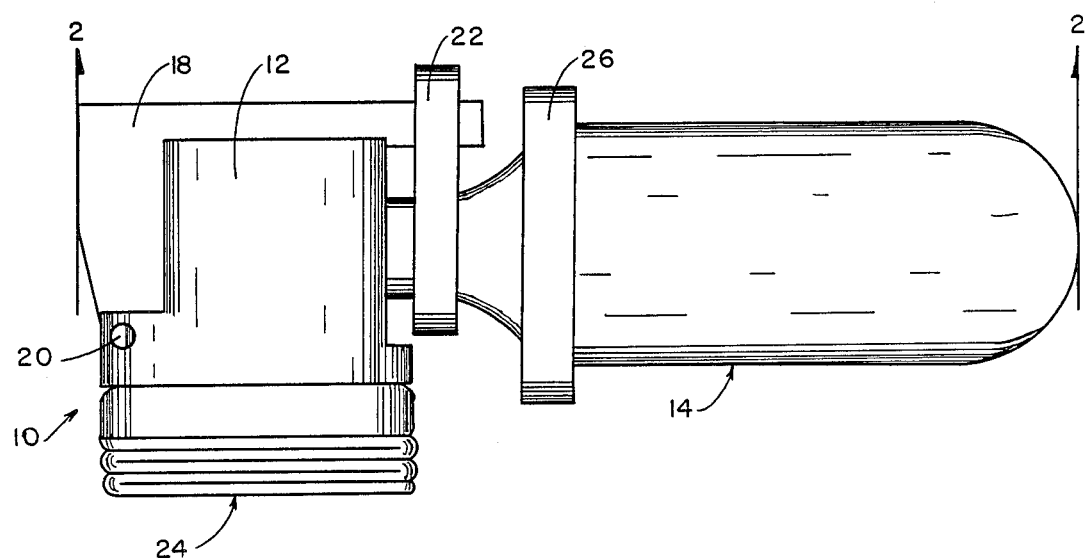
FIG. 1 is a side elevational view of a preferred embodiment of the present invention.
Figure 2:
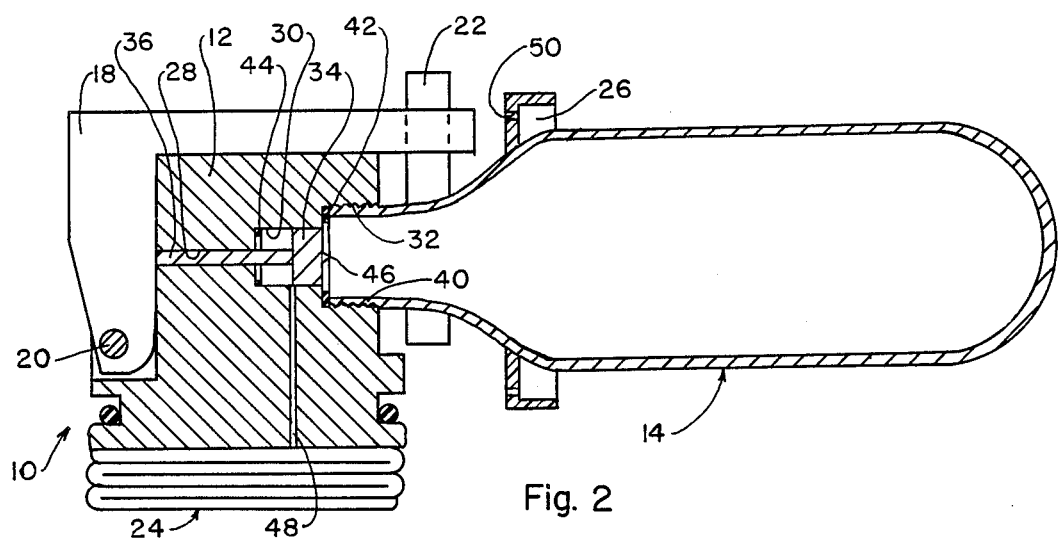
FIG. 2 is a cross-sectional view of the preferred embodiment of FIG. 1 in a closed position taken along lines 2—2 of FIG. 1.

Referring to the drawings, more particularly by reference numbers, number 10 identifies the valve mechanism including a main body portion 12 as shown in FIG. 1. The main body portion 12 has a compressed gas container 14 extending into the bore 16 through main body portion 12. The main body portion 12 has a lever member 18 pivotally connected thereto by pivot connection 20. Water destructible member 22 extends around the lever member 18 and around a portion of the compressed gas container 14 to retain the lever member 18 in a closed position. Main body portion 12 also has an inflatable article 24 attached thereto to receive gas when the present invention is in operation. Inflatable article 24 is attached by any suitable means. As shown in FIG. 1, inflatable article 24 is attached directly to the main body portion 12. A water flow regulator 26 is shown attached to the compressed gas container 14 which acts in conjunction with a non-permeable cover 27 (FIG. 4) to control the destructibility of member 22. As shown in FIG. 2, the main body portion 12 has a cross bore 28 extending therethrough. Adjacent the cross bore 28 and in communication therewith is a counter bore 30 which has a threaded counter bore 32 adjacent thereto and in communication therewith. A piston head member 34 is positioned in the counter bore 30 with the piston shaft member 36 extending rearwardly therefrom through cross bore 28.

Compressed gas container 14 preferably has a neck portion 38 extending therefrom with a passageway 40 extending therethrough to allow gas to pass therethrough. The neck portion 38 has threads positioned thereon and extends into threaded counter bore 32 and is engaged thereby. Where a compressed gas container is utilized that does not have a neck portion extending therefrom, the counter bore 32 can be made adaptable to receive the container adjacent the end thereof so that when the container is pierced the compressed gas will pass therefrom and into bore 30. The compressed gas container 14 may be made replaceable so that the same device can be utilized repeatedly or alternatively, the compressed gas container 14 may be integrally connected to the main body portion 12 whereby the device will be replaced after it has once been used. Sealing gasket 42 seals the gas container to retain the compressed gas therein. Sealing gasket 44 is positioned within counter bore 30 adjacent cross bore 28 and is adaptable to receive piston shaft member 36 therethrough to prevent the leakage of gas from threaded counter bore 30. The piston head member 34 has a gasket piercing pin 46 adapted for piercing the sealing gasket 42. When piston head member 34 abuts sealing gasket 42 there is a sealing engagement formed to retain the gas within gas capsule 14 after piercing pin 30 has pierced the sealing gasket 42.

Opening 48 provides a gas relief passageway that is in communication with the counter bore 30 when piston head member 34 is spaced from the sealing means 42. When piston head member 34 abuts sealing means 42 to form a sealing engagement therebetween, opening 48 is closed off from communication with the counter bore 30. The opening 48 is positioned to register with an opening (not shown) in the inflatable article 24 to allow gas to pass therethrough to the inflatable article 24.

Figure 3:
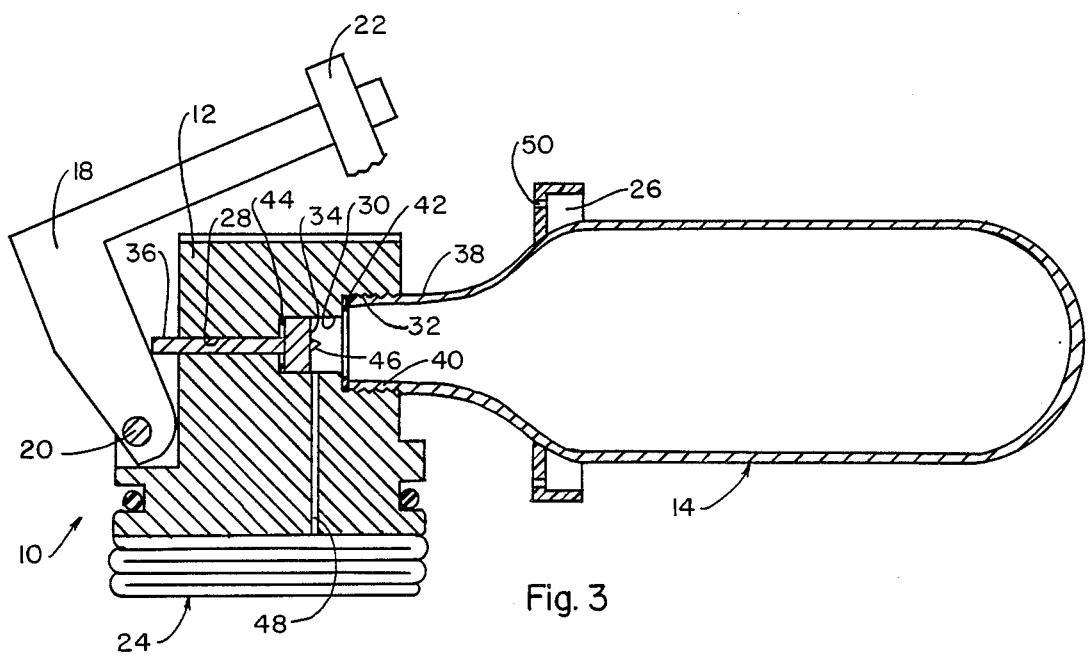
FIG. 3 is a cross-sectional view of the preferred embodiment of FIG. 1 in an open position taken along lines 3—3 of FIG. 1.

Lever member 18 is pivotally connected to the main body portion 12 at 20. Lever member 18 is positioned to abut the end of the piston shaft member 36 to hold the piston head member 34 in sealing engagement with sealing gasket 42. As shown in FIGS. 2 and 3, the lever member 36 is movable between an open and a closed position. FIG. 2 shows the lever member 18 in a closed position wherein water destructible member 22, which can be a water soluble paper ring, retains the lever member 18 in the closed position. When in the closed position, the lever member 18, in combination with the water destructible member 22, retains the piston shaft member 36 within the cross bore 28 thereby maintaining a sealing engagement between the piston head member 34 and sealing gasket 42. FIG. 3 shows the lever member 18 in an open position wherein the force associated with the compressed gas causes the piston head member 34 to move out of sealing engagement with the sealing gasket 42. The piston shaft member 36 slides through the cross bore 28 whereby the opening 48 forming the gas relief passageway is exposed to the gas that has entered the counter bore 30 due to the disengagement of the piston head member 34 and the sealing gasket 42. The gas then passes through the opening 48 to the inflatable article 24. Due to the pressure created within the counter bore 30 from the expanding gas, piston head member 34 is forced to the rear of counter bore 30 to a position wherein piston head member 34 abuts sealing gasket 44 thereby further preventing gas leakage from counter bore 30.

Figure 4:
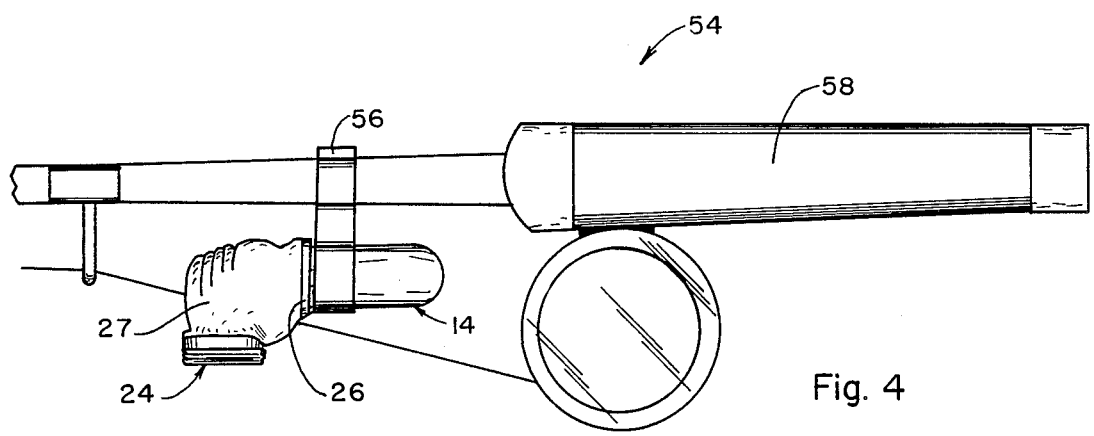
FIG. 4 is a perspective view illustrating the preferred embodiment of the present invention.

There is provided in the preferred embodiment a water flow regulator member 26 that extends around and is attached to the compressed gas container 14. The water flow regulator member 26 is open on the side facing the compressed gas container 14 and has a plurality of small holes 50 on the opposite side. An absorbent material such as foam rubber is placed adjacent the plurality of holes. An alternate embodiment contemplates that the water flow regulator be integrally formed with the main body portion. A valve cover 27, made of non-permeable material, is placed over the valve mechanism 10 and pinched around the water flow regulator member 26 as shown in FIG. 4. The valve cover 27 also has an opening therein to resiliently engage the inflatable article 24 as inflatable article 24 extends therethrough and is attached to the main body portion 12 with the opening in the inflatable article 24 being in registration with opening 48. Inflatable article 24 is therefore free to inflate and the resilient engagement of valve cover 27 with inflatable article 24 prevents water from entering therethrough. Since the valve cover 27 protects the valve mechanism 10 and the water destructible member 22, the water flow regulator member 26, through which the water must pass to reach the water destructible member 22, controls the operativeness of the device. The valve cover 27 also protects the device from the weather which causes corrosion and non-functioning of the parts as well as premature activation. Thus, if the device is dropped or placed in shallow water a longer time will be required to activate the valve mechanism 10. If the device is exposed to rain or moisture, the valve mechanism 10 will not be activated. However, when the device is dropped or placed in deeper water, the water pressure will be greater which will force more water through the water flow regulator member 26 and into the valve cover 27, thereby exposing the water destructible member 22 thus allowing the device to become operative in a short period of time.

In operation, the lever member 18 is placed in the closed position as shown in FIG. 2, which forces the piston shaft member 36 and piston head member 34 in a direction toward threaded counter bore 32 thereby causing gasket piercing pin 46 to pierce sealing gasket 42 when compressed gas container 14 is attached adjacent to counter bore 30. Alternatively, lever member 18 can be moved to the closed position after attachment of compressed gas container 14 whereby sealing gasket 42 is pierced in the same manner. The piston head member 34 abuts sealing gasket 42 thereby maintaining a sealing engagement to retain the compressed gas, such as carbon dioxide, in compressed gas container 14. A water destructible member 22 is placed over the lever member 18 and the neck portion 38 of compressed gas container 14 to retain lever member 18 in a closed position. Water destructible member 22 is in the form of a band or strip of water soluble rayon or paper. The thickness of the band or strip can vary depending on the strength of the band or strip that is required to hold lever member 18 in the closed position. This will depend on the pressure in the compressed gas container 14 and will also depend on the composition of water destructible member 22. In the preferred embodiment, water destructible member 22 is formed of tissue type paper that is relatively thin and will readily absorb water.

The device is then attached to or incorporated into a sinkable object by any suitable means including clasp means and the like. As shown in FIG. 4, the device is attached to a fishing rod 54 by clasp member 56 which extends around the compressed gas container 14 and fishing rod 54. Upon the dropping or placing of the sinkable object in water, the water will dissolve or otherwise destroy water destructible member 22 thereby rendering lever member 18 free to pivot between the closed position and open position. The compressed carbon dioxide forces piston head member 34 in a direction away from compressed gas container 14 thereby breaking the sealing engagement between piston head member 34 and sealing gasket 42. This forces piston shaft member 36 rearwardly which forces lever member 18 to pivot to the open position. As piston head member 34 is forced away from sealing gasket 42 the opening 48 communicates with the compressed carbon dioxide. The carbon dioxide then passes through opening 48 and through the opening in inflatable article 24. The inflation of the inflatable article 24 then causes the sinkable object to float to the surface of the water for easy retrieval. If the device is constructed with the compressed gas container being replaceable, the device can be utilized again by replacing the water destructible member 22 and the compressed gas container 14. If the device is constructed with the gas container being integrally connected to main body portion 12, the device must be replaced.

The size of the present device will vary according to its intended use. For fishing rods and the like the device can be constructed so as to be adaptable to incorporate the device into the fishing rod handle. Larger sinkable objects require a larger device embodying the present invention and such devices can readily be constructed according to the disclosure herein. In addition, for much larger objects a cord or rope can be used with one end attached to the device disclosed herein and the opposite end attached to the sinkable object. The present device will float the cord or rope to the surface so that the sinkable object can be pulled to the surface by pulling the rope or cord. The present device can easily be operated manually by attaching a string, handle or like device to the water destructible member 22 before attachment to or incorporation into a sinkable object. In addition, attachment of a string, handle or like device to lever member 18 will also provide means for manual operation since the water destructible member 22 is constructed of relatively light material such as a paper ring. This would provide a device adaptable for use in life preservers or other like devices wherein the user can manually operate the valve mechanism as desired, or if the user is unable to manually operate the flotation device the device will automatically inflate upon submersion in water.

Thus there has been shown and described novel means for an inflatable float device for sinkable objects which fulfills all of the objects and advantages sought therefor. It will be apparent, however, that many changes, variations, modifications, or other uses and adaptations of the subject device are possible, and all such changes, variations, modifications, or other uses and adaptations which do not depart from the spirit of the present invention are deemed to be covered by the invention which is limited only by the claims which follow.

What is claimed is:

1. A flotation device comprising an inflatable member having an inlet opening therein, a compressed gas source including a container therefor with a port therein, means normally sealing said port, a body member having a bore extending therethrough, means connecting the port of the compressed gas container to the body member adjacent the bore and in registration therewith in position so that the means closing the port extends across said bore, a piston member positioned in the bore and movable therein between a first position engaging the means sealably closing the port in the compressed gas container and a second position spaced from said sealing means, said piston member having means thereon capable of rupturing the means sealably closing the port in the compressed gas container in the first position thereof, an outlet port through the body member communicating the bore with the inlet opening of the infaltable member when said piston member is in the second position thereof, piston engaging means positioned on said body member and movable between one position wherein said piston engaging means retains said piston member in the first position thereof and another position wherein said piston engaging means allows said piston member to be moved to said second position thereof, liquid responsive means adaptable for retaining said piston engaging means in the one position thereof and adaptable for releasing said piston engaging means when exposed to a liquid thereby enabling the compressed gas in the compressed gas container to move the piston from said first position to said second position thereby establishing communication between the compressed gas in the compressed gas container and the inflatable member by way of the bore and the outlet port in the body member, liquid flow regulator means comprising a non-permeable cover member placed over and around said device, said cover member having a first opening therein to allow said inflatable member to resiliently pass therethrough and a second opening to allow the port of said compressed gas container to extend therethrough to adjacent the bore, and means adjacent said second opening to regulate the amount of liquid that can pass therethrough.

2. The device of claim 1 wherein the body member includes pivot means operatively engageable with the piston engaging means, and wherein the piston engaging means includes a first portion attached to said pivot means, a second portion with which the liquid responsive means is operatively engageable, and a third portion positioned intermediate of said first and second portions for engaging said piston member.

3. The device of claim 1 wherein said means connecting the port of the compressed gas container to the body member includes threaded means on said compressed gas container and means on said bore to engage said threaded means.

4. The device of claim 1 wherein said body member includes means for engaging said inflatable member in position to register the inlet opening therein with said outlet port through the body member.

5. The device of claim 1 wherein said piston member includes a piston head having means thereon capable of rupturing the means sealably closing the port in the compressed gas container and having a piston shaft extending therefrom to and through an opening in said body member for engagement with said piston engaging means.

6. The device of claim 1 including means for manually releasing said piston engaging means thereby enabling the compressed gas in said compressed gas container to move the piston from the first position to the second position.

* * * * *